United States Patent [19]

Tada

[11] Patent Number: 4,996,395
[45] Date of Patent: Feb. 26, 1991

[54] SEAT BELT RETRACTION AND SWITCH WITH PERIPHERAL INTERNAL GEARING AND PLANETARY GEARING ASSEMBLY

[75] Inventor: Tatsuo Tada, Kanagawa, Japan

[73] Assignee: Nippon Seiko Kabushiki Kaisha, Tokyo, Japan

[21] Appl. No.: 375,407

[22] Filed: Jul. 5, 1989

[30] Foreign Application Priority Data

Jul. 6, 1988 [JP] Japan ................ 63-168156

[51] Int. Cl.$^5$ ............... B65H 75/00; F16H 57/00; H01H 3/16
[52] U.S. Cl. .................. 200/61.58 B; 242/107.4 R; 475/162
[58] Field of Search ........ 200/52 R, 61.58 R, 61.58 B, 200/61.15, 61.16, 61.17; 475/162, 176; 242/107.4 R, 107.40

[56] References Cited

U.S. PATENT DOCUMENTS

| 3,406,594 | 10/1968 | Pickles | 475/162 |
| 3,767,134 | 10/1973 | Morales | 242/107.4 R |
| 3,804,192 | 4/1974 | Takada | 180/82 |
| 3,853,284 | 12/1974 | Hasegawa et al. | 242/107.4 R |
| 3,862,727 | 1/1975 | Fisher | 200/61.58 B X |
| 3,876,163 | 4/1975 | Kobrehel | 200/61.58 B X |
| 3,880,379 | 4/1975 | Booth | 200/61.58 B X |

FOREIGN PATENT DOCUMENTS 60-61955 4/1985 Japan.

*Primary Examiner*—J. R. Scott
*Attorney, Agent, or Firm*—Wegner, Cantor, Mueller & Player

[57] ABSTRACT

A retractor is provided with a detector for the amount of a webbing wound on a retractor shaft. The detector is of the type that the amount of the webbing wound on the retractor shaft is determined on the basis of the number of revolutions which the retractor shaft has undergone. The retractor includes first and second internal gears, at least one planetary gear and a switch actuator. The first and second internal gears have different numbers of teeth, and are arranged side by side in the direction of an axis of the retractor shaft. The first internal gear is fixed on the base while the second internal gear is rotatably supported on the base. The planetary gear is provided on the retractor shaft and is maintained in meshing engagement with both the first and second internal gears. A switch actuator is formed on the second internal gear and a switch is provided on the base.

6 Claims, 4 Drawing Sheets

SEAT BELT RETRACTION AND SWITCH WITH PERIPHERAL INTERNAL GEARING AND PLANETARY GEARING ASSEMBLY

BACKGROUND OF THE INVENTION

1) Field of the Invention:

This invention relates to a retractor with a means for detecting the amount of a wound webbing, said retractor being suitable for use in a seat belt system for protecting an occupant in the event of a vehicular emergency, and especially to a retractor capable of detecting a released, i.e., unlatched state of an emergency release buckle on the basis of the amount of a wound webbing.

2) Description of the Related Art:

Webbing retractors have conventionally been provided with an unlatched buckle warning device to detect unlatching of a tongue, which is fastened to one end of an associated webbing, from the corresponding emergency release buckle.

In the above unlatched buckle warning device, detection of tongue unlatching from the emergency release buckle has generally been conducted on the basis of the amount of the webbing wound in the retractor. Known means for the detection of the amount of a wound webbing include those relying upon the diameter of a webbing wound on an associated retractor shaft, said diameter varying depending on the amount of the webbing wound on the retractor shaft, and those making use of the number of revolutions of a retractor shaft which has taken up an associated webbing.

The former means are accompanied by a drawback that they are not fully reliable in the accuracy of detection, because the webbing may not be wound in the form of a true circle on the retractor shaft and the diameter of the wound webbing changes as little as the thickness (1.0–1.5 mm) of the webbing per revolution of the retractor shaft.

On the other hand, the latter means require to conduct detection after significant reduction of the number of revolutions of the retractor shaft of the webbing retractor, since the retractor shaft undergoes as many as 10–20 revolutions. Combining of conventional gears for the significant reduction of the number of revolutions of the retractor shaft has however led to need for more gears and a smaller module. This has in turn resulted in a more complex structure and also in a strength reduction.

Because of the significant reduction of the number of revolutions of the retractor shaft, the accuracy of detection is substantially affected by any error in the position of a detector, leading to another drawback that the latter means are not fully reliable in the accuracy of detection.

SUMMARY OF THE INVENTION

In view of the above-described drawbacks of the conventional techniques, it is an object of this invention to provide a retractor with a means for detecting the amount of a wound webbing, said means being capable of accurately detecting the amount of the wound webbing and having a simple, compact and strong structure.

In a first aspect of this invention, there is thus provided a retractor with a means for detecting the amount of a webbing wound on a retractor shaft supported rotatably on a base, said means being of the type that the amount of the webbing wound on the retractor shaft is determined on the basis of the number of revolutions which the retractor shaft has undergone, comprising:

first and second internal gears having different numbers of teeth and arranged side by side in the direction of an axis of the retractor shaft, said first internal gear being fixed on the base, and said second internal gear being rotatably supported on the base;

at least one planetary gear provided on the retractor shaft, said planetary gear meshing with both the first and second internal gears; and a switch actuator formed on the second internal gear.

When the numbers of the teeth of the fixed and rotatably-supported internal gears are represented by Za and Zb, respectively, the reduction ratio R of the number of rotations of the rotatably-supported internal gear relative to the number of revolutions of the retractor shaft can be expressed as follows:

$$R = Zb/(Zb - Za)$$

It is thus possible to achieve a large reduction ratio.

Further, both the internal gears are used in combination as a differential gear assembly. It is thus possible to make the number of teeth smaller and also to make the module larger, so that a retractor with a means for detecting the amount of a wound webbing, said means having a simple and strong structure, can be obtained.

In a second aspect of this invention, the retractor according to the aforementioned first aspect of this invention is additionally provided with a means capable of adjusting the fixed position of the first internal gear relative to the base, for example, additional teeth formed in the first internal gear and a stopper supported on the base and adapted to engage the additional teeth.

The retractor according to the second aspect of this invention can bring about the same advantages as the retractor according to the first aspect of this invention. Upon prewinding of the retractor shaft, the initial position of the second internal gear with the switch actuator formed thereon can also be adjusted to and set at a predetermined point by turning the first internal gear after rotation of the second internal gear is stopped by the stopper. It is thus possible to improve the accuracy of detection further.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENT

Figure 1:
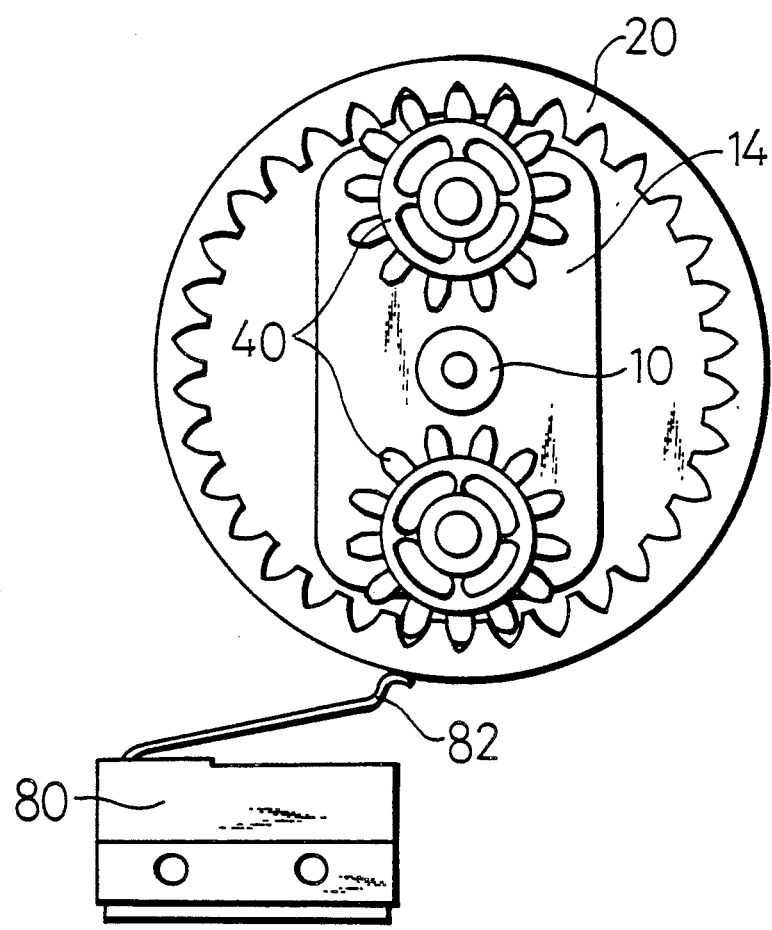
FIGS. 1 through 3 show the principle of operation of a retractor with a means for detecting the amount of a wound webbing, according to one embodiment of this invention.
Figure 2:
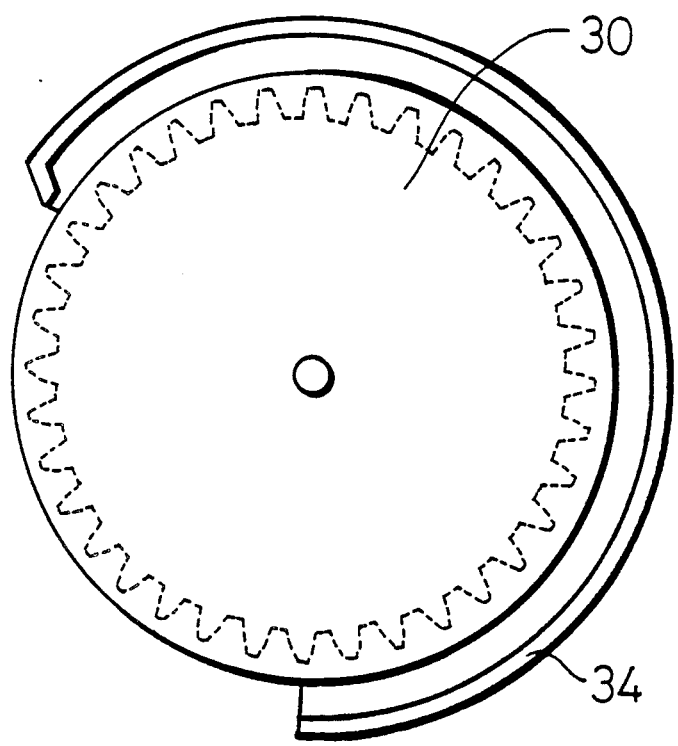
Figure 3:
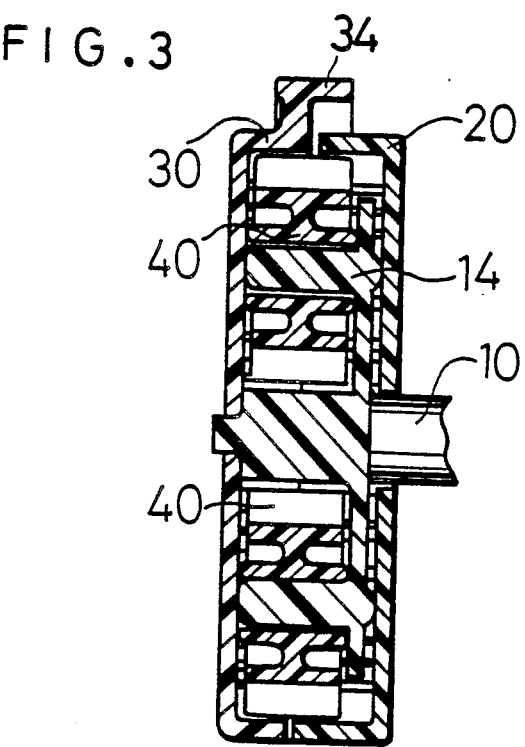

Referring first to FIGS. 1 through 3, a substantially rectangular rotary plate 14 is secured on a retractor shaft 10. Two rotary gears 40,40 are rotatably provided as planetary gears at opposite end portions of the rotary plate 14, whereby the rotary gears 40,40 are arranged symmetrically to each other with respect to the retractor shaft 10.

Each of the rotary gears 40,40 is in meshing engagement with both a fixed internal gear 20 and a rotatable internal gear 30. On the retractor shaft 10, the internal gears 20,30 are provided side by side in the direction of an axis of the retractor shaft 10. The numbers of teeth of the internal gears 20,30 are Za and Zb, respectively. A flange 34 adapted as a switch actuator to actuate a limit switch 80 is provided on the outer periphery of the rotatable internal gear 30.

An actuated finger 82 of the limit switch 80 is disposed in the path of rotation of the flange 34 formed on the outer periphery of the rotatable internal gear 30, so that the limit switch 80 is turned on or off when the flange 34 is brought into contact with the actuated finger 82 or is brought away from the actuated finger 82.

When the retractor shaft 10 revolves, the rotary plate 14 is rotated. The rotary gears 40,40 mounted on the rotary plate 14 are then caused to rotate while meshing with the internal teeth of the fixed internal gear 20. Since the rotary gears 40,40 are also in meshing engagement with the internal teeth of the rotatable internal gear 30 at the same time and the number of the teeth of the fixed internal gear 20 is different from that of the rotatable internal gear 30, the rotatable inner gear 30 begins to rotate relative to the fixed internal gear 20.

Here, the number of rotations of the rotatable internal gear 30 relative to the number of revolutions of the retractor shaft 10 is determined by a reduction ratio R, which is expressed by the following formula:

$$R = Zb/(Zb - Za)$$

wherein Za is the number of the teeth of the fixed internal gear 20 and Zb is the number of the teeth of the rotatable internal gear 30.

As a consequence, the revolutions of the retractor shaft 10 are reduced at the reduction ratio R and are then transmitted to the rotatable internal gear 30. The flange 34 formed on the outer periphery of the rotatable internal gear 30 is then brought into contact with the actuated finger 82 of the limit switch 80, thereby making it possible to detect that the retractor shaft 10 has undergone at least a predetermined number of revolutions.

Since both the internal gears 20,30 are used as a differential gear assembly, it is also possible to use fewer gears and hence a larger module. It is thus possible to obtain a retractor with a means for detecting the amount of a wound webbing, which has a simple and strong structure.

Figure 4:
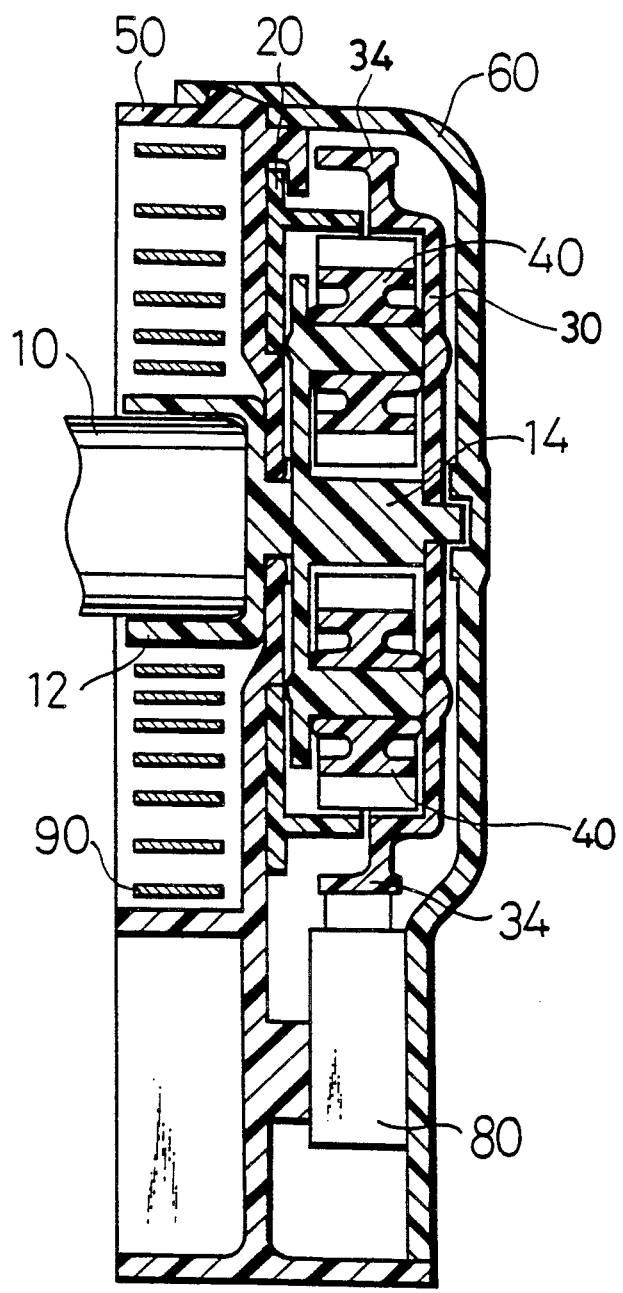
FIG. 4 is a top plan view of the retractor according to the embodiment, in which an upper cover has been removed to show the detecting means.
Figure 5:
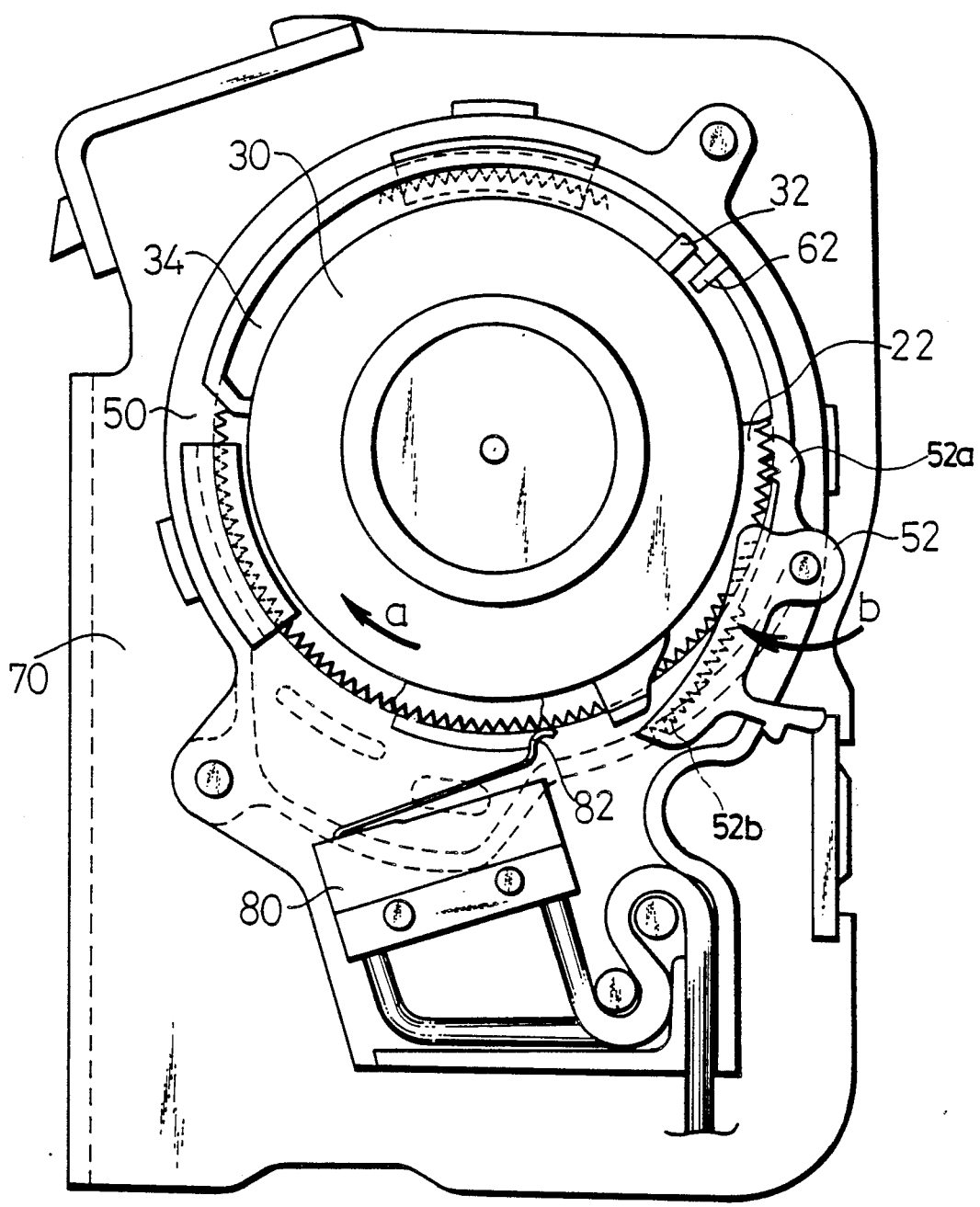
FIG. 5 is a fragmentary axial cross-sectional view of the retractor according to the embodiment.

Referring next to FIGS. 4 and 5, the retractor of the present embodiment will be described more specifically.

The retractor with the means for detecting the amount of the wound webbing is constructed of a retractor base 70 and a sub-assembly mounted thereon.

The sub-assembly includes an upper cover 60 and a lower cover 50. Inside the lower cover 50, are arranged the retractor shaft 10 and a winding spring 90 which applies a webbing-winding force to the retractor shaft 10.

On the other hand, arranged inside the upper cover 60 are a revolution number reducing mechanism—which is constructed of the fixed internal gear 20, the rotatable internal gear 30 and rotary gears 40,40 as planetary gears—and the limit switch 80 operatively connected to the revolution number reducing mechanism and adapted to detect the number of revolutions of the retractor shaft 10. The substantially-rectangular rotary plate 14 is mounted on the retractor shaft 10 via a cap 12 and is received for rotation within the upper cover 60. The two rotary gears 40,40 are rotatably provided as planetary gears on the opposite end portions of the rotary plate 14.

The internal gear 20 is fixed on the lower cover 50. This fixing of the internal gear 20 has been achieved by bringing stopper teeth 22, which are formed in an outer peripheral portion of the internal gear 20 arranged rotatably on the upper surface of the lower cover 50, into engagement with a toothed stopper 52 pivotally supported on the lower cover 50.

A prewinding stopper 32 is formed on the outer periphery of the rotatable internal gear 30, so that the prewinding stopper 32 projects out from the outer periphery of the rotatable internal gear 30. On the other hand, a matching prewinding stopper 62 is formed on the upper cover 60 in such a way that the stopper 62 projects radially and inwardly and stops rotation of the rotatable internal gear 30 at the prescribed position.

In the illustrated embodiment, it is possible to make the timing of actuation of the limit switch 80 constant irrespective of the amount of the webbing wound on the retractor shaft 10 so that unlatching of the tongue of the webbing from the emergency release buckle can be detected accurately.

To adjust the actuation timing of the limit switch 80, the sub-assembly is mounted on the side wall of the retractor base 70 first of all.

The retractor shaft 10 is then caused to revolve in a direction a to prewind the winding spring 90.

Since the stopper teeth 22 formed on the outer periphery of the internal gear 20 is held unrotatable relative to the lower cover 50 by means of the toothed stopper 52 supported on the lower cover 50, the rotatable internal gear 30 rotates in the direction a.

The prewinding stopper 32 of the rotatable internal gear 30 is thus brought into contact with the prewinding stopper 62 of the upper cover 60, so that the rotatable internal gear 30 is stopped at the predetermined position. A further revolution of the retractor shaft 10 in the direction a then causes to release the engagement between the stopper teeth 22 of the internal gear 20 and the teeth 52a of the stopper 52, whereby the internal gear 20 then rotates in a direction opposite to the direction a.

After completion of the prewinding of the retractor shaft 10, the toothed stopper 52 is turned in a direction b to bring the stopper teeth 22 of the internal gear 20 into engagement with teeth 52b of the toothed stopper 52 so that the internal gear 20 is fixed on the lower cover 50. The timing adjusting work has now been completed.

In the above embodiment, the teeth 52b of the toothed stopper 52 are brought into engagement with the stopper teeth 22 of the internal gear 20. It is however possible to omit the teeth 52b and to have the teeth 52a engaged with the stopper teeth 22 of the internal gear 20.

According to the method described above, the initial position of the rotatable internal gear 30 can be set irrespective of the amount of the webbing wound on the retractor shaft 10. It is therefore possible to improve the accuracy of detection by the detection for the amount of the webbing wound on the retractor shaft.

Two rotary gears are provided in the above-described embodiment. It is however possible to use only one rotary gear or three or more rotary gears as needed.

I claim:

1. A retractor with a means for detecting the amount of a webbing wound on a retractor shaft supported rotatably on a base, said means being of the type that the amount of the webbing wound on the retractor shaft is determined on the basis of the number of revolutions which the retractor shaft has undergone, comprising:

first and second internal gears having different numbers of teeth and arranged side by side in the direction of an axis of the retractor shaft, said first internal gear being provided on the base, and said second internal gear being rotatably supported on the base;

a rotary plate fixed on the retractor shaft and having a support portion at a position deviated from the center axis of the retractor shaft; and at least one planetary gear rotatably supported on the support portion of the rotary plate, said planetary gear having a number of teeth which are formed in an outer periphery of said planetary gear and which are in meshing engagement with both the first and second internal gears.

2. The retractor as claimed in claim 1, wherein two planetary gears are provided on the retractor shaft in such a way that the planetary gears are arranged symmetrically to each other with respect to the axis of the retractor shaft and are maintained in meshing engagement with both the first and second internal gears.

3. The retractor as claimed in claim 1, further comprising:

a switch provided on the base; and switch actuator means for actuating said switch, said switch actuator means being formed on said second internal gear.

4. The retractor as claimed in claim 3, further comprising timing adjusting means for adjusting the timing of actuation of said switch, said timing adjusting means comprising:

means for stopping rotation of the second internal gear at a first predetermined position relative to the base; and means for allowing, subsequent to stoppage of rotation of the second internal gear by means of the stopping means, the first internal gear to rotate relative to the base in a direction opposite to the direction in which the second internal gear has rotated, and then for holding said first internal gear at a second predetermined position relative to the base so that the first internal gear is prevented from rotating relative to the base.

5. The retractor as claimed in claim 4, wherein said allowing and holding means comprises additional teeth formed in the first internal gear and a stopper supported on the base and adapted to engage the additional teeth.

6. A retractor with a means for detecting the amount of a webbing wound on a retractor shaft supported rotatably on a base, said means being of the type that the amount of the webbing wound on the retractor shaft is determined on the basis of the number of revolutions which the retractor shaft had undergone, comprising:

first and second internal gears having different numbers of teeth, said first and second internal gears being arranged side by side in the direction of an axis of the retractor shaft, said first internal gear being fixed on the base, and said second internal gear being rotatably supported on the base;

a rotary plate fixed on the retractor shaft and having a support portion at a position deviated from the axis of the retractor shaft; and at least one planetary gear rotatably supported on the support portion of the rotary plate, said planetary gear having a number of teeth which are formed in an outer periphery of said planetary gear and which are in meshing engagement with both the first and second internal gears.

* * * * *